(12) United States Patent  
Bowden (10) Patent No.: US 12,534,123 B2  
(45) Date of Patent: Jan. 27, 2026

(54) HYDRAULIC PARALLEL WORK SYSTEMS (71) Applicant: FEMA Corporation of Michigan, Portage, MI (US)

(72) Inventor: Charles Bowden, Battle Creek, MI (US)

(73) Assignee: FEMA CORPORATION OF MICHIGAN, Portage, MI (US)

( * ) Notice: Subject to any disclaimer, the term of this patent is extended or adjusted under 35 U.S.C. 154(b) by 1047 days.

(21) Appl. No.: 17/285,728

(22) PCT Filed: Oct. 16, 2019

(86) PCT No.: PCT/US2019/056437  
§ 371 (c)(1),  
(2) Date: Apr. 15, 2021

(87) PCT Pub. No.: WO2020/081627  
PCT Pub. Date: Apr. 23, 2020

(65) Prior Publication Data  
US 2022/0001915 A1 Jan. 6, 2022

Related U.S. Application Data

(60) Provisional application No. 62/746,877, filed on Oct. 17, 2018.

(51) Int. Cl.  
*B62D 1/22* (2006.01)  
*B62D 5/065* (2006.01)  
(Continued)

(52) U.S. Cl.  
CPC ............... *B62D 1/22* (2013.01); *B62D 5/065* (2013.01); *B62D 5/075* (2013.01); *B62D 5/093* (2013.01)

(58) Field of Classification Search  
CPC .......... B62D 1/22; B62D 5/065; B62D 5/075; B62D 5/093  
See application file for complete search history.

(56) References Cited

U.S. PATENT DOCUMENTS 3,952,509 A 4/1976 Coleman  
RE29,252 E 6/1977 Miller  
(Continued)

FOREIGN PATENT DOCUMENTS

DE 3938417 C1 3/1991  
DE 102005056039 A1 6/2007  
(Continued)

OTHER PUBLICATIONS

Sep. 28, 2020 International Search Report and Written Opinion for PCT/US20/41395, 12 pages.

(Continued)

*Primary Examiner* — Valentin Neacsu  
*Assistant Examiner* — Michael R Stabley  
(74) *Attorney, Agent, or Firm* — Honigman LLP; Douglas H. Siegel; Alexander A. Knuth (57) ABSTRACT

A system for hydraulic parallel work systems is provided. The system includes a fixed displacement pump (110), a closed-center circuit (300), an open-center hand metering unit (HMU) (200), and a tank (120). The closed-center circuit is in fluid communication with the fixed displacement pump. The open-center HMU is in fluid communication with the fixed displacement pump at an inlet port (204) of the HMU. The tank is fluidly connected to the inlet port of the HMU when the HMU is inactive.

29 Claims, 6 Drawing Sheets

(51) Int. Cl.
    *B62D 5/07*           (2006.01)
    *B62D 5/093*         (2006.01)

(56) References Cited

U.S. PATENT DOCUMENTS

| | | | |
|---|---|---|---|
| 4,217,968 A | | 8/1980 | Dezelan |
| 4,240,457 A | | 12/1980 | Riediger |
| 4,356,759 A | | 11/1982 | Ljubimov et al. |
| 4,412,415 A | | 11/1983 | Thomsen et al. |
| 4,663,936 A | | 5/1987 | Morgan |
| 4,736,811 A | * | 4/1988 | Marsden .......... B62D 5/32 91/6 |
| 4,781,219 A | | 11/1988 | Haarstad et al. |
| 4,858,515 A | | 8/1989 | Karlberg |
| 4,914,913 A | * | 4/1990 | St. Germain .......... B62D 5/09 60/462 |
| 4,942,935 A | | 7/1990 | Lech |
| 5,065,793 A | | 11/1991 | Stephenson et al. |
| 5,101,860 A | | 4/1992 | Stephenson |
| 5,117,935 A | * | 6/1992 | Hall .......... B62D 5/061 60/446 |
| 5,129,424 A | | 7/1992 | Stephenson et al. |
| 5,209,317 A | | 5/1993 | Schnelle |
| 5,413,452 A | | 5/1995 | Lech et al. |
| 5,511,457 A | | 4/1996 | Hawkins et al. |
| 5,609,221 A | * | 3/1997 | Endsley .......... B62D 7/1509 180/442 |
| 5,826,487 A | * | 10/1998 | A'Hearn .......... F15B 11/05 91/532 |
| 5,826,676 A | | 10/1998 | Ko |
| 5,927,072 A | * | 7/1999 | Vannette .......... F15B 13/022 60/452 |
| 6,122,912 A | | 9/2000 | Phillips |
| 6,216,806 B1 | | 4/2001 | Toms |
| 6,490,861 B2 | | 12/2002 | Biggi et al. |
| 6,769,348 B2 | | 8/2004 | Hudson et al. |
| 7,343,934 B2 | | 3/2008 | Pride, II et al. |
| 7,610,935 B2 | | 11/2009 | Arbjerg |
| 7,610,988 B2 | | 11/2009 | Porskrog et al. |
| 7,837,001 B2 | | 11/2010 | Young et al. |
| 7,980,354 B2 | | 7/2011 | Thomsen et al. |
| 7,997,379 B2 | | 8/2011 | Kryhlmand et al. |
| 8,079,439 B2 | | 12/2011 | Porskrog et al. |
| 8,167,081 B2 | | 5/2012 | Byrd et al. |
| 8,272,471 B2 | | 9/2012 | Gehlhoff |
| 8,651,225 B2 | | 2/2014 | Cadman et al. |
| 9,101,090 B2 | | 8/2015 | Pierce et al. |
| 9,878,737 B2 | * | 1/2018 | McIlheran .......... B62D 5/065 |
| 9,915,276 B2 | | 3/2018 | Bruck et al. |
| 10,001,147 B2 | | 6/2018 | Kleitsch |
| 10,435,064 B2 | | 10/2019 | Krahn |
| 10,668,947 B2 | | 6/2020 | Eagles |
| 10,960,923 B2 | | 3/2021 | Bergmann |
| 11,318,988 B2 | * | 5/2022 | Mate .......... B62D 15/025 |
| 2002/0108802 A1 | | 8/2002 | Draper |
| 2003/0051471 A1 | | 3/2003 | Draper et al. |
| 2003/0163989 A1 | | 9/2003 | Collet et al. |
| 2006/0218909 A1 | | 10/2006 | Khalil et al. |
| 2006/0231147 A1 | | 10/2006 | Pride, II et al. |
| 2009/0090882 A1 | | 4/2009 | Reilly et al. |
| 2009/0145501 A1 | | 6/2009 | Kiessling et al. |
| 2009/0218161 A1 | | 9/2009 | Cadman et al. |
| 2009/0272598 A1 | | 11/2009 | Gehlhoff |
| 2009/0293976 A1 | | 12/2009 | Stretch |
| 2010/0200090 A1 | | 8/2010 | Sturman |
| 2010/0224434 A1 | | 9/2010 | Perry et al. |
| 2013/0087209 A1 | | 4/2013 | Krahn |
| 2014/0138165 A1 | | 5/2014 | Bebernes et al. |
| 2015/0223386 A1 | | 8/2015 | Nafziger et al. |
| 2016/0288827 A1 | | 10/2016 | Bebernes et al. |
| 2017/0072998 A1 | | 3/2017 | Krahn |
| 2018/0186402 A1 | | 7/2018 | Irie |
| 2018/0328420 A1 | | 11/2018 | Choi et al. |

FOREIGN PATENT DOCUMENTS

| | | |
|---|---|---|
| WO | WO2013049582 A2 | 4/2013 |
| WO | WO2013049582 A3 | 4/2013 |
| WO | WO2015028108 A1 | 3/2015 |
| WO | WO2015134706 A1 | 9/2015 |

OTHER PUBLICATIONS

Aug. 24, 2020 International Search Report and Written Opinion for PCT/US20/039837, 9 pages.

Feb. 10, 2020 International Search Report and Written Opinion for PCT/US19/56437, 18 pages.

Jun. 27, 2022 European Search Report for EP19874440.1, 13 pages.

* cited by examiner

HYDRAULIC PARALLEL WORK SYSTEMS

CROSS-REFERENCE TO RELATED APPLICATION

This application is a national phase entry of PCT/US2019/056437, filed Oct. 16, 2019, and claims the benefit of priority to U.S. Provisional Application Ser. No. 62/746,877, filed Oct. 17, 2018. The entire contents of the aforementioned disclosures are incorporated herein by reference in their entirety.

TECHNICAL FIELD

This disclosure relates to hydraulic parallel work systems and methods.

BACKGROUND

Hydraulics typically refers to the use of relatively high density incompressible liquids (i.e. hydraulic fluid) to perform work. Hydraulic systems may use an arrangement of one or more hydraulic circuits to perform this work (e.g., moving an object). A hydraulic circuit generally includes components performing operations based on fluid dynamics. Hydraulic circuits often control fluid flow and therefore fluid pressure to perform work either within the circuit or external to the circuit. Some circuits, such as metering circuits, may precisely control flow to influence a speed at which the components perform work. For example, how fast a steering system steers equipment (i.e., a vehicle). A hydraulic circuit may be controlled mechanically and/or electrically (e.g., by electrical signals). As the use of automation becomes increasingly common, hydraulics offers precise control at low speeds as well control of large forces to perform a wide range of functions.

SUMMARY

One aspect of the disclosure provides a system for hydraulic parallel work. The system includes a fixed displacement pump and a closed-center circuit in fluid communication with the fixed displacement pump. The system also includes an open-center hand metering unit (HMU) in fluid communication with the fixed displacement pump at an inlet port of the HMU and a tank fluidly connected to the inlet port of the HMU when the HMU is inactive.

Implementations of the disclosure may include one or more of the following optional features. In some implementations, the closed-center circuit includes a steering valve and an enable valve where the enable valve is in fluid communication with the steering valve and includes a first position and a second position. In this implementation, the second position is configured to provide fluid communication between the fixed displacement pump and the steering valve. Here, the system may include a modulating valve with an input port in fluid communication with the fixed displacement pump and an output port in fluid communication with the inlet port of the HMU. Optionally, the first position of the enable valve may be a closed position, the input port of the modulating valve may be fluidly connected to the fixed displacement pump, and the output port of the modulating valve may be fluidly connected to the inlet port of the HMU. In some examples of this implementation, the first position of the enable valve is an open position including a first-position fluid connection between a supply input port and a tank port where the tank port is in fluid communication with the inlet port of the HMU. In this example, the input port of the 113 modulating valve is in parallel fluid communication with a first fluid connection between the fixed displacement pump and the supply input port of the enable valve, and the output port of the modulating valve is in parallel fluid communication with a second fluid connection between the tank port of the enable valve and the inlet port of the HMU. In another example of this implementation, the first position of the enable valve is an open position where the open position includes a first-position fluid connection between a supply input port and a tank port where the supply input port is in fluid communication with an outlet port of the HMU and the outlet port of the HMU is in fluid communication with the fixed displacement pump at a center position of the HMU. In this example, the input port of the modulating valve is in parallel fluid communication with a first fluid connection between the outlet port of the HMU and the supply input port of the enable valve and the output port of the modulating valve is in parallel fluid communication with a second fluid connection between the tank and the tank port of the enable valve. In some configurations of this implementation, the modulating valve includes a hydraulic signal line in fluid communication with a working port of the closed-center circuit.

When the closed-center circuit includes a steering valve and an enable valve, the system may include a relief valve including an input port and an output port where the input port of the relief valve in parallel fluid communication with a first fluid connection between a supply input port of the enable valve and the fixed displacement pump and where the output port of the relief valve in parallel fluid communication with a tank port of the enable valve and the inlet port of the HMU. Here, the enable valve may include a third position, the second position of the enable valve and the third position of the enable valve defining a spool valve configured to prioritize fluid flow to the closed-center circuit.

In some implementations, each of the closed-center circuit and the HMU include a steering valve fluidly communicating with the fixed displacement pump. Here, each of the steering valve of the closed-center circuit and the steering valve of the HMU may include a proportional spool valve where the proportional spool valve of the closed-center circuit provides automated steering by actuating and transferring hydraulic fluid from the fixed displacement pump to one or more hydraulic cylinders based on an electrical input. When each of the steering valve of the closed-center circuit and the steering valve of the HMU include a proportional spool valve, the system may include a modulating valve including an input port, an output port, and a hydraulic signal line. Here, the input port is in fluid communication with the fixed displacement pump, the output port is in fluid communication with the inlet port of the HMU, and the hydraulic signal line is in fluid communication with a working port of the closed-center circuit. Further, when each of the steering valve of the closed-center circuit and the steering valve of the HMU include a proportional spool valve, the proportional spool valve of the closed-center circuit may include a variable orifice where the variable orifice is defined by an orifice area proportional to a position of the proportional spool valve. Here, when the orifice area increases, a modulating valve may decrease fluid communication to the HMU.

Another aspect of the disclosure provides a method for hydraulic parallel work. The method includes providing a hydraulic fluid from a fixed displacement pump to a closed-center circuit and an open-center hand metering unit (HMU).

The method also includes activating an enable valve of the closed-center circuit from a first position to a second position. The second position communicates the hydraulic fluid from the fixed displacement pump to a steering valve of the closed-center circuit. The method further includes receiving an automated electronic steering input actuating the steering valve. In response to the received automated electronic steering input, the method includes providing hydraulic fluid from an input port of the steering valve to a working port of the steering valve. The method also includes communicating the hydraulic fluid from the working port of the steering valve to one or more steering hydraulic cylinders.

This aspect may include one or more of the following optional features. In some examples, the method includes deactivating the closed-center circuit by switching the enable valve to the first position and metering hydraulic fluid from an input port of a modulating valve connected to the fixed displacement pump to an inlet port of the HMU through an output port of the modulating valve. The first position corresponds to a closed position of the enable valve. Here, deactivating the closed-center circuit may occur in response to a failure at the closed-center circuit.

In some configurations, the method includes deactivating the closed-center circuit by switching the enable valve to the first position, the first position corresponding to an open position of the enable valve with a first-position fluid connection between a supply input port of the enable valve and a tank port of the enable valve, and providing hydraulic fluid from the fixed displacement pump to an inlet port of the HMU. Here, the method may also include transitioning the enable valve of the closed-center circuit from the second position to a third position and providing hydraulic fluid from a relief valve to the HMU. The second position and the third position of the enable valve may define a proportional spool valve. The relief valve may include an input port and an output port, the input port of the relief valve in parallel fluid communication with a first fluid connection between the fixed displacement pump and the supply input port of the enable valve, and the output port of the relief valve in parallel fluid communication with a second fluid connection between the tank port of the enable valve and the inlet port of the HMU.

In some implementations, the method includes providing hydraulic fluid from a hydraulic signal line of a modulating valve to the working port of the steering valve, the modulating valve in fluid communication with the fixed displacement pump and the HMU. In some examples of this implementation, the method includes metering hydraulic fluid from an input port of the modulating valve to an inlet port of the HMU through an output port of the modulating valve. Here, the input port of the modulating valve is in parallel fluid communication with a first fluid connection between the fixed displacement pump and a supply input port of the enable valve and the output port of the modulating valve is in parallel fluid communication with a second fluid connection between a tank port of the enable valve and the inlet port of the HMU. In other examples of this implementation, the method includes metering hydraulic fluid from an input port of the modulating valve to a tank through an output port of the modulating valve. Here, the input port of the modulating valve is in parallel fluid communication with a first fluid connection between the fixed displacement pump through an outlet of the HMU and a supply input port of the enable valve and the output port of the modulating valve is in parallel fluid communication with a second fluid connection between the tank port of the enable valve and the tank.

In some configurations, the method includes providing hydraulic fluid from a hydraulic signal line of a modulating valve to the working port of the steering valve and the method includes metering hydraulic fluid to the HMU through the modulating valve based on a position of the steering valve of the closed-center circuit. In this configuration, the modulating valve is in fluid communication with the fixed displacement pump and the HMU. Here, the metering hydraulic fluid step may also include increasing an orifice area of a variable orifice of the steering valve and decreasing hydraulic flow to the HMU. In some examples, each of the closed-center circuit and the HMU include at least one steering valve, each of the at least one steering valve is a proportional spool valve.

Yet another aspect of the disclosure provides a vehicle including one or more hydraulic steering cylinders. The vehicle includes a fixed displacement pump and a closed-center steering circuit in fluid communication with the fixed displacement pump. The vehicle also includes an open-center hand metering unit (HMU) in fluid communication with the fixed displacement pump at an inlet port of the HMU. The vehicle further includes a tank fluidly connected to the inlet port of the HMU when the HMU is inactive. The closed-center steering circuit and the HMU hydraulically communicate with the one or more hydraulic steering cylinders.

This aspect may include one or more of the following optional features. In some implementations, the closed-center steering circuit includes a steering valve and an enable valve, the enable valve is fluidly connected to the steering valve and includes a first position and a second position, the second position is configured to provide fluid communication between the fixed displacement pump and the steering valve. Here, the vehicle may include a modulating valve including an input port in fluid communication with the fixed displacement pump and an output port fluidly connected to the inlet port of the HMU. When the vehicle includes the modulating valve, the first position of the enable valve may be a closed position, the input port of the modulating valve may be fluidly connected to the fixed displacement pump, and the output port of the modulating valve may be fluidly connected to the inlet port of the HMU. Optionally, when the vehicle includes the modulating valve, the first position of the enable valve may be an open position including a first-position fluid connection between a supply input port and a tank port, the tank port in fluid communication with the inlet port of the HMU, the input port of the modulating valve may be in parallel fluid communication with a first fluid connection between the fixed displacement pump and the supply input port of the enable valve, and the output port of the modulating valve may be in parallel fluid communication with a second fluid connection between the tank port of the enable valve and the inlet port of the HMU. Additionally or alternatively, when the vehicle includes the modulating valve, the first position of the enable valve may be an open position, the input port of the modulating valve may be in parallel fluid communication with a first fluid connection between the outlet port of the HMU and the supply input port of the enable valve, and the output port of the modulating valve may be in parallel fluid communication with a second fluid connection between the outlet port of the HMU and the tank port of the enable valve. Here, the open position includes a first-position fluid connection between a supply input port and a tank port, the supply input port in fluid communication with an outlet port of the HMU, the outlet port of the HMU in fluid communication with the fixed displacement pump at a center position of the HMU.

The modulating valve may include a hydraulic signal line in fluid communication with a working port of the closed-center steering circuit.

When the closed-center steering circuit includes a steering valve and an enable valve, the vehicle may include a relief valve including an input port and an output port. Here, the input port of the relief valve is in parallel fluid communication with a first fluid connection between a supply input port of the enable and the fixed displacement pump, and the output port of the relief valve is in parallel fluid communication with a tank port of the enable valve and the inlet port of the HMU. The enable valve may include a third position, the second position of the enable valve and the third position of the enable valve defining a spool valve configured to prioritize fluid flow to the closed-center steering circuit.

In some examples, each of the closed-center steering circuit and the HMU includes a steering valve fluidly communicating with the fixed displacement pump. In this example, each of the steering valve of the closed-center circuit and the steering valve of the HMU may include a proportional spool valve, the proportional spool valve of the closed-center circuit providing automated steering by actuating and transferring hydraulic fluid from the fixed displacement pump to one or more hydraulic cylinders based on an electrical input. Here, the vehicle may also include a modulating valve including an input port, an output port, and a hydraulic signal line, the input port in fluid communication with the fixed displacement pump, the output port in fluid communication with the inlet port of the HMU, and the hydraulic signal line in fluid communication with a working port of the proportional spool valve of the closed-center steering circuit. The proportional spool valve of the closed-center steering circuit may include a variable orifice, the variable orifice defined by an orifice area proportional to a position of the proportional spool valve. When the orifice area increases, a modulating valve may decrease fluid communication to the HMU.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
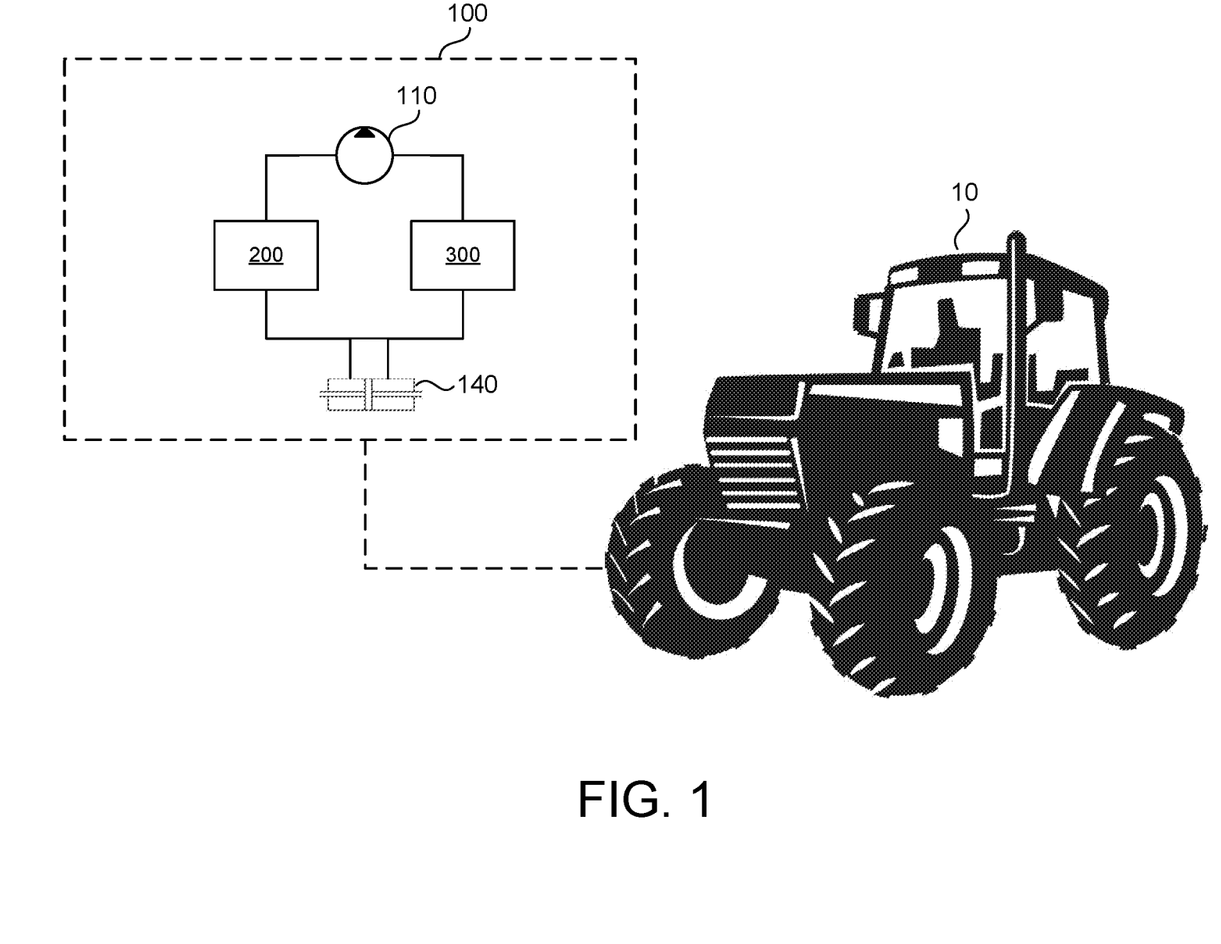
FIG. 1 is a schematic view of an example vehicle implementing a hydraulic work system.

FIG. 1 is an example of a work environment with a hydraulic system 100. Within the work environment, a vehicle 10, such as, for example, a recreational vehicle, a construction vehicle, or an agricultural vehicle, incorporates a hydraulic system 100 to perform one or more functions of the vehicle 10. The hydraulic system 100 includes a fixed displacement pump 110 providing hydraulic fluid to an open-center hand metering unit (HMU) circuit 200 (referred to as the HMU circuit 200) and a closed-center circuit 300. Here, the term "circuit" refers to a hydraulic circuit. As previously stated, the hydraulic circuit generally includes components performing operations based on fluid dynamics that may be controlled mechanically and/or electrically (e.g., by electrical signals)

Referring to FIGS. 1-5, the hydraulic system 100 includes the fixed displacement pump 110 and a tank 120 in fluid communication with the HMU circuit 200 and the closed-center circuit 300. Generally speaking, a pump is a mechanical component that generates fluid energy (i.e. fluid flow governed by fluid velocity) by transferring mechanical energy to a fluid. For example, a motor shaft transfers torque to a pump shaft and generates a fluid velocity. Hydraulic pumps may be hydrodynamic or hydrostatic. A hydrodynamic pump tends to decrease in capacity as a head pressure corresponding to the pump increases (e.g., based on fluid leakage and pressure decay when the pump stops). On the other hand, a hydrostatic pump typically delivers a fixed volume of fluid from its inlet to its outlet regardless of outlet port pressure. Here, the fixed displacement pump 110 generally refers to hydrostatic positive displacement type pump where the amount of displacement (e.g., a flow rate such as gallons per minute (gpm)) cannot vary. For example, a particular displacement rate of gallons per minute cannot change unless a drive speed of the pump changes.

Since hydraulic systems, such as the hydraulic system 100, are closed systems, hydraulic fluid of the system is often stored and/or returned to a tank, such as the tank 120. The tank 120 generally refers to a low pressure section of the hydraulic system 100 relative to an operating pressure of the fixed displacement pump 110. In other words, the tank 120 may be an actual reservoir or an ancillary hydraulic circuit that operates at a lower pressure than the operating pressure. The tank 120 may vary according to temperature and based on component design of a hydraulic circuit corresponding to the tank 120. The tank 120 may additionally serve to regulate a temperature of the operating fluid (i.e., cool the fluid by removing heat).

A hydraulic system, such as the hydraulic system 100, may include a system relief valve 130. The system relief valve 130 for the hydraulic system 100 is designed as a pressure regulating device to prevent pressure failure. For example, a failure in the hydraulic system 100 may cause the operating pressure to increase to a pressure that may compromise components within the hydraulic system 100. To prevent this type of failure, the system relief valve 130 may be configured to relieve the pressure to the tank 120 when the system relief valve 130 determines that a pressure satisfies a threshold level of pressure. For example, the threshold level of pressure may correspond to a level of pressure that exceeds a spring tension of the system relief valve 130 and biases the spring of the system relief valve 130 to permit flow to the tank 120.

Optionally, the hydraulic system 100 includes a pilot tank 150. The pilot tank 150 may be implemented in the hydraulic system 100 because some components of the hydraulic system 100 cannot function with a normal pressure that a tank provides. In other words, connecting these components to the tank 120 may cause pressure issues in the hydraulic system 100. For example, certain hydraulic components may need a lower pressure than the tank 120 and thus, require the pilot tank 150. In the examples shown in FIGS. 2-5, valves within the closed-center circuit 300 (e.g., the pilot valve(s) 330) demand a different tank pressure and therefore fluidly communicate with the pilot tank 150 by pilot lines shown in equal segment dotted lines to and from components of the hydraulic system 100.

Referring further to FIGS. 1-5, the hydraulic system 100, via the operation of the closed-center circuit 300 and the HMU circuit 200, operates one or more hydraulic cylinders 140 to perform work. For example, when the hydraulic system 100 corresponds to a steering system, the one or more hydraulic cylinders 140 perform the work of steering a vehicle (e.g., the vehicle 10 of FIG. 1). The one or more hydraulic cylinders 140 may correspond to any type of cylinder utilizing hydraulic fluid. Some examples of cylinders include single acting cylinders, double acting cylinders, rodless cylinders, etc. For example, in a simple steering system, a front axle of a steering system may be driven by two single acting cylinders (e.g., one for each front wheel) or a double acting cylinder (e.g., tied together by tie rods of a rack and pinion to jointly operate the front wheels). In FIGS. 2-5, the hydraulic system 100 operates a double acting cylinder 140 where a first fluid line 142 is configured to supply hydraulic fluid to extend a piston in a first direction $d_1$ and a second fluid line 144 is configured to supply hydraulic fluid to extend the piston of the cylinder 140 in a second direction $d_2$ opposite the first direction $d_1$. In the case of a steering hydraulic system (e.g., FIG. 1), the extension of the piston within the cylinder 140 pivots or turns the wheels of the vehicle 10 for steering.

Figure 2:
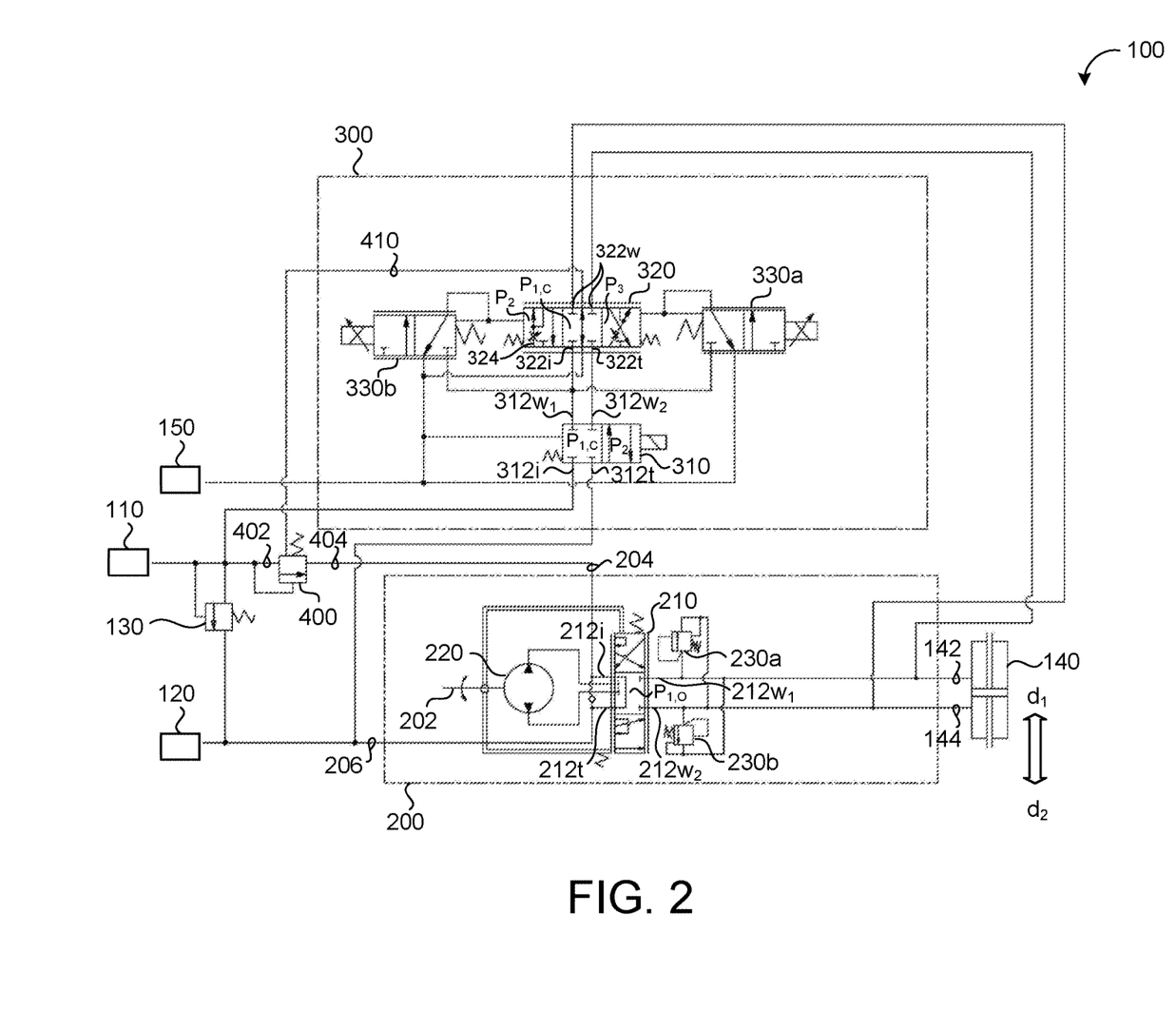
FIGS. 2-5 are schematic views of example hydraulic systems.

The HMU circuit 200 refers to a hydraulic circuit configured to operate an open-center hand-metering unit (HMU). The HMU is configured to receive a manual steering input 202 (shown as a curved line with an arrowhead on each end); and, based on the manual steering input, the HMU meters hydraulic fluid to the cylinder(s) 140. For instance, the manual steering input 202 is an operator of the vehicle 10 turning a steering wheel. In some examples, the HMU includes a steering valve 210 (e.g., a proportional spool valve) and a bi-directional pump 220. In these examples, when the HMU receives the manual steering input 202, the steering input rate of the input 202 shifts the steering valve 210 to a position P that provides the hydraulic fluid to a working port 212w ($212w_1$, $212w_2$) in fluid communication with the cylinder 140. For example, as shown in FIG. 2, a first working port $212w_1$ is connected to the first fluid line 142 while a second working port $212w_2$ is connected to the second fluid line 144. Hydraulic fluid from either working port 212w may drive the piston of the cylinder 140 to perform work steering the vehicle 10. When the steering wheel is turned faster, the steering valve 210 moves further from a neutral (i.e. center) position based on the increased rate of input rotation. When the steering valve 210 translates further from the center position, the steering valve 210 may supply more hydraulic fluid to drive the cylinder 140 and thus perform a faster turn for the vehicle 10. The fluid rate from the bi-directional pump and position of steering valve 210 is directly related to the steering input rate.

Optionally, the HMU circuit 200 includes one or more cylinder port reliefs 230 (230a, 230b). As shown in FIGS. 2-5, the HMU circuit 200 includes two cylinder port reliefs 230a, 230b each connected to a working port 212w of the steering valve 210. Much like the system relief valve 130, the cylinder port relief 230 is a pressure regulating device in case an undesirable pressure occurs at the cylinder(s) 140. For example, when the piston of the cylinder 140 is driven to a top dead center position and more hydraulic fluid is provided to continue driving the piston in the direction of the top dead center position, the cylinder 140 may experience a catastrophic failure due to increased pressure from the additional hydraulic fluid. To prevent these types of failures, the cylinder port relief 230 may be set to relieve a pressure exceeding a pressure threshold for the cylinder 140. For instance, the cylinder port relief 230 may determine that the pressure at the cylinder 140 exceeds the pressure threshold for the cylinder 140 and then relieve the pressure exceeding the pressure threshold by providing hydraulic fluid to counteract the pressure.

A previously mentioned, the steering valve 210 of the HMU circuit 200 is an open-center valve defining the "open-center" designation of the HMU circuit 200. An open-center valve refers to a valve that has a center (neutral) position $P_{1,O}$ where a fluid supply port and a tank port (i.e., exhaust port) are fluidly connected such that, in the center position $P_{1,O}$, hydraulic fluid may flow from the fluid supply port to the tank port. For reference, in FIGS. 2-5, a closed position is designated $P_C$ (e.g., a first position that is closed is shown as $P_{1,C}$) and an open position is designated $P_O$ (e.g., a first position that is open is shown as $P_{1,O}$). For example, FIGS. 2-5 depict the steering valve 210 as a proportional spool valve with an open-center position $P_{1,O}$ (e.g., shown as a tandem-center proportional spool valve). By providing hydraulic fluid through the HMU in the closed position, the HMU may have pressure (i.e. by the hydraulic fluid) available from the fixed displacement pump 110 to operate the HMU at any point during operation of the fixed displacement pump 110 (e.g., to instantaneously interrupt the functionality of the closed-center circuit 300). An open-center valve is a contrast to a closed-center type valve where, in a center position or neutral position, the closed-center valve stops hydraulic fluid flow between ports because the ports are closed.

The closed-center circuit 300 generally refers to a hydraulic circuit in fluid communication with the fixed displacement pump 110 that is configured to provide hydraulic fluid to perform work for the vehicle 10. The closed-center circuit 300 is designated a "closed-center" circuit because the circuit 300 includes a closed-center type valve where, in a center position $P_C$ or a neutral position, the closed-center valve stops hydraulic fluid flow between ports because the ports are closed.

Figure 3:
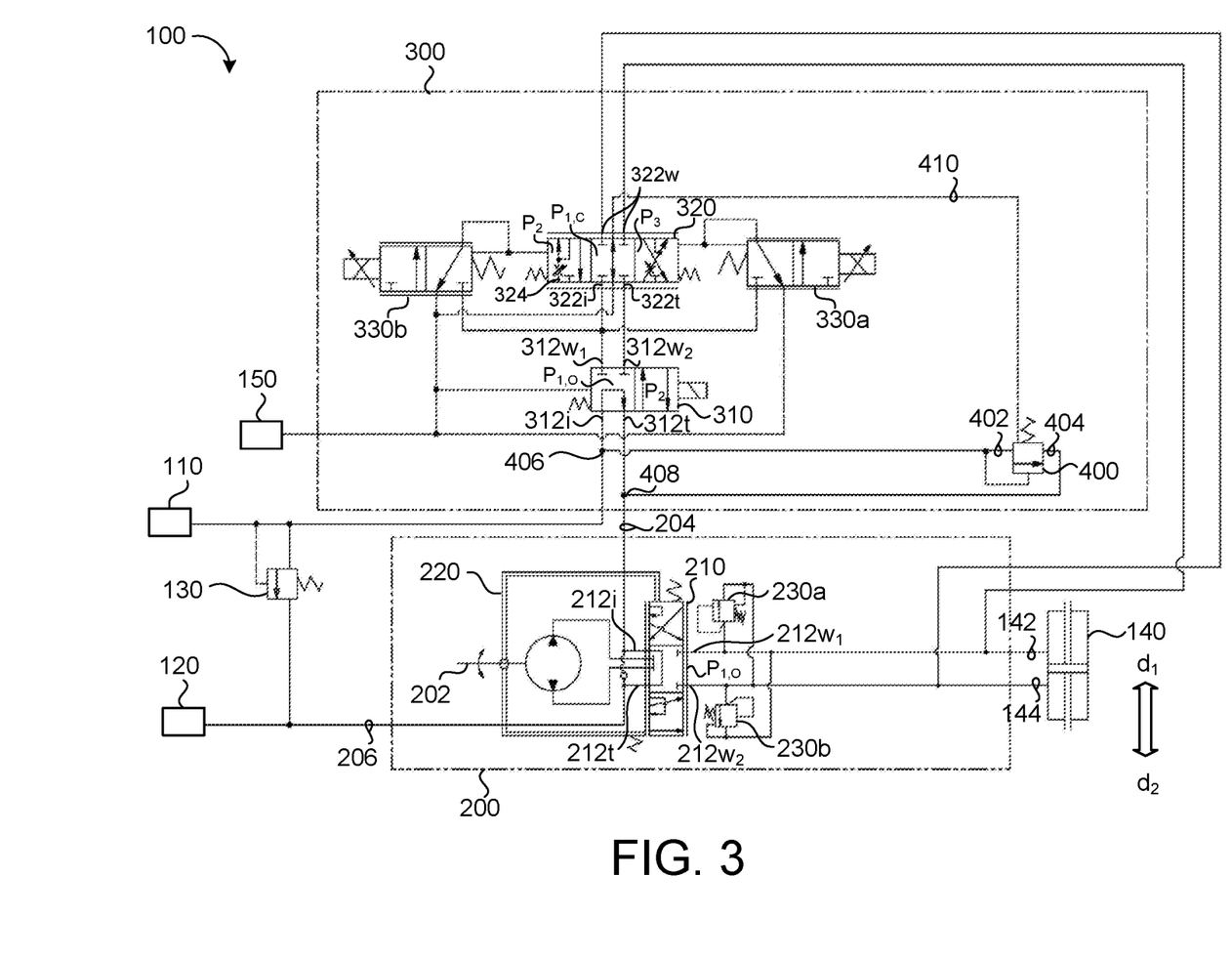
Figure 4:
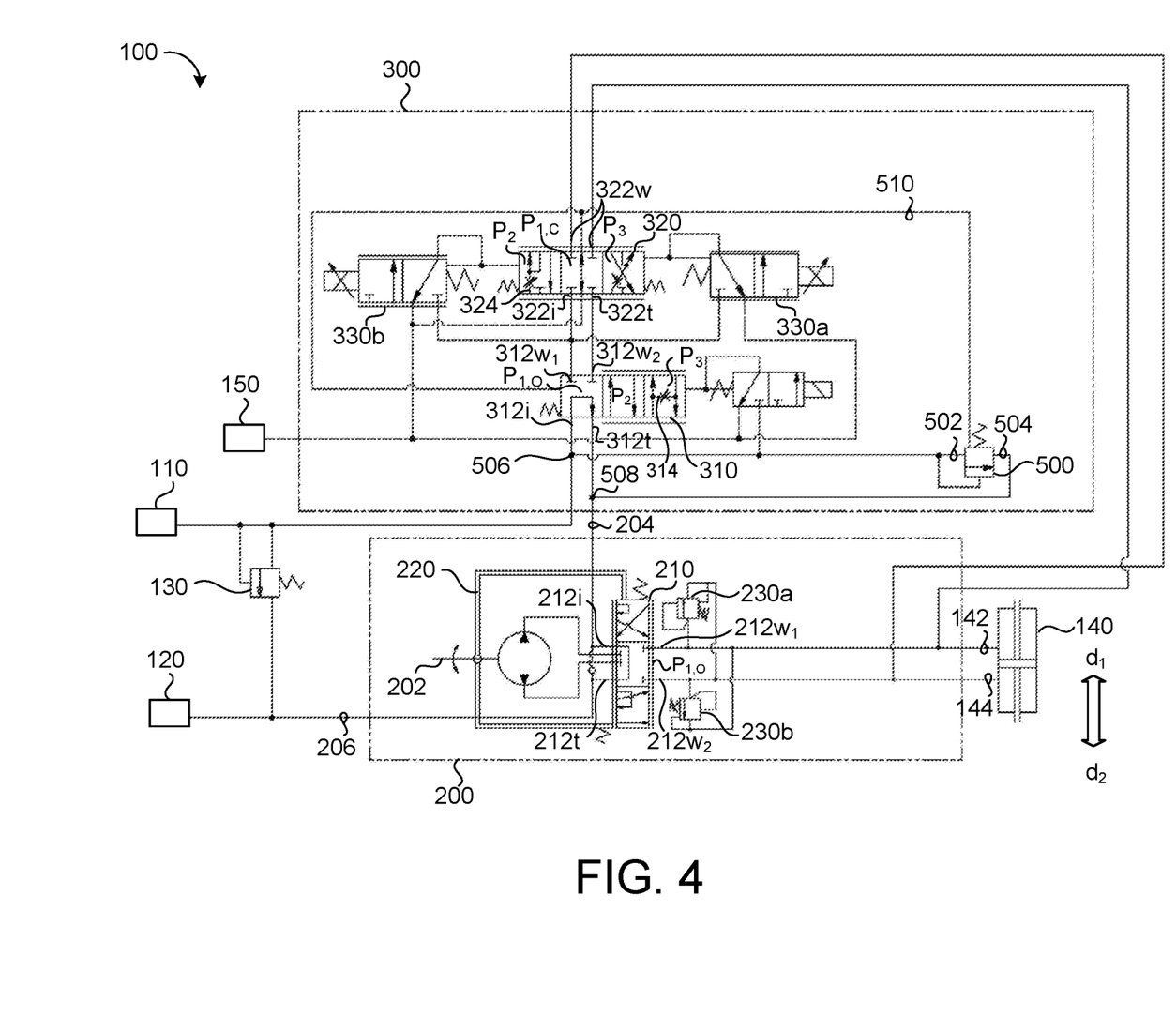

In some examples, such as FIGS. 2-5, the closed-center circuit 300 is a closed-center guided steering circuit including an enable valve 310 and a steering valve 320. In these examples, the enable valve 310 functions like a switch that blocks fluid communication to the steering valve 320 in a first position $P_1$ (e.g., shown in FIG. 2 as a closed position $P_{1,C}$) and permits fluid communication to the steering valve 320 in a second position $P_2$. In other words, the enable valve 310 may activate or deactivate the closed-center circuit 300 (i.e. the functionality/work produced by the closed-center circuit 300) based on a position P of the enable valve 310. In one example, the enable valve 310 deactivates the closed-center circuit 300 in the first position $P_1$ and activates the closed-center circuit 300 in the second position $P_2$ (or a third position $P_3$ as shown in FIG. 4). For example, the enable valve 310 receives an electrical signal from a solenoid to actuate the enable valve 310 to change positions.

In some configurations, such as FIGS. 2-5, the first position $P_1$ of the enable valve 310 is an open position $P_{1,O}$ where the open position $P_{1,O}$ includes a fluid connection between a supply input port 312i and a tank port 312t. In these configurations, the fixed displacement pump 110 may supply hydraulic fluid to the HMU circuit 200 when the enable valve 310 is in the open position $P_{1,O}$. In some implementations, the enable valve 310 includes a proportional spool (e.g., FIG. 4) where a second position $P_2$ and a third position $P_3$ of the enable valve 310 define the proportional spool. By including a proportional spool, the enable valve 310 may dynamically meter hydraulic flow to the HMU circuit 200 while transitioning between the second position $P_2$ and the third position $P_3$. Additionally or alternatively, the proportional spool may be configured to prioritize fluid flow to the closed-center circuit 300.

With continued reference to the examples of FIGS. 2-5, the steering valve 320 is a closed-center type valve defining the "closed-center" designation of the closed-center circuit 300. In one example, the steering valve 320 is configured to operate as part of a guided steering circuit (e.g., a global positioning system (GPS) guided steering system). In some examples, the steering valve 320 shifts positions to steer the vehicle 10 based on electrical inputs corresponding to a GPS position. In some implementations, the steering valve 320 shifts positions based on a force from one or more pilot valves 330 (330a, 330b), e.g., by a force from hydraulic pressure of a hydraulic signal line. For example, the pilot valve(s) 330 receive electronic signals steering the vehicle 10 to follow a path based on GPS positional coordinates. The electronic signal may be configured to actuate the steering valve 320 to a position P relative to the center position $P_C$ that provides hydraulic fluid to the cylinder 140; thus, generating a proportional steering response for the vehicle 10.

Each of the valves described herein (e.g., steering valves 210, 320, relief valves 130, 230, pilot valves 330, and a modulating valve 400) may switch positions based on actuators associated with the valves. These actuators may be combinations of electronical (e.g., solenoids) or mechanical (e.g., pilot pressure lines and springs). Generally, hydraulic schematics, such as FIGS. 2-5, illustrate the actuators at one or both ends of a respective valve. For example, the pilot valves 330 (330a, 330b) include solenoid actuators that receive an electrical signal to activate each pilot valve 330 to change positions P. In other examples, mechanical means such as spring tension or hydraulic pilot pressure (e.g., via hydraulic signal lines) may maintain a valve in a position P or actuate a valve to change positions P. Moreover, each valve may have one or more positions P designated by a block (e.g., two blocks corresponds to two positions and three blocks corresponds to three positions). At each position, the schematics of FIGS. 2-5 show the ports within the positions and indicate the flow of the hydraulic fluid by arrows between ports or the lack of flow at a port by a closed "T" symbol. More specifically, although the schematic representations show proportional spool valves with generally three-positions, proportional spool valves may be represented with infinite positions between zero to one-hundred percent stroke of the valve. In other words, the three-position proportional spool valves illustrate a simplified version.

In some configurations, the steering valves 210, 320 are proportional spool valves. A proportional spool valve is a valve that may have infinite positions to allow the spool to move between zero to one-hundred percent stroke. Generally, spool valves move against a restoring force of a spring and often are configured with solenoids, force motors, or indirect solenoids (e.g., via the pilot valves 330) to ensure a predicable movement between positions that overcomes the restoring force. Hydraulic schematics, such as FIGS. 2-5 typically depict proportional spool valves with bars above and below the valve to designate that the proportional spool valve moves within a sleeve. In some implementations, a transformer (e.g., a linear variable differential transformer (LVDT)) measures a position of the proportional spool valve.

In some examples, the circuits 200, 300 are both hydraulic circuits that provide steering for the hydraulic system 100. In these examples, the circuits 200, 300 operate in parallel such that the hydraulic system 100 may steer a vehicle 10. In other words, the fixed displacement pump 110 is in fluid communication with both circuits 200, 300 such that either the HMU circuit 200 actuates the cylinder 140 and/or the closed-center circuit 300 actuates the cylinder 140. In some configurations, when the hydraulic system 100 receives the manual steering input 202, the hydraulic system 100 deactivates operation of the closed-center circuit 300. By deactivating the operation of the closed-center circuit 300, the HMU circuit 200 may be used to steer a vehicle 10 generally free of hydraulic interference (e.g., reduced hydraulic pressure) from the operation of the closed-center circuit 300. For example, in a configuration where both circuits 200, 300 perform steering operations, it may be preferable to deactivate (e.g., manually override) the operation of the closed-center circuit 300. In other configurations, the hydraulic system 100 is configured to operate both circuits 200, 300 in parallel (e.g., simultaneously). For example, the closed-center circuit 300 generates hydraulic pressure to perform work other than steering. Some examples of other implementations for the closed-center circuit 300 include lifting, drilling, grasping, digging, shoveling, etc. (e.g., operations of a construction vehicle or an agricultural vehicle). Although the closed-center circuit 300 may perform other operations, the closed-center circuit 300 for simplicity is often described herein with reference to a steering operation.

Figure 5:
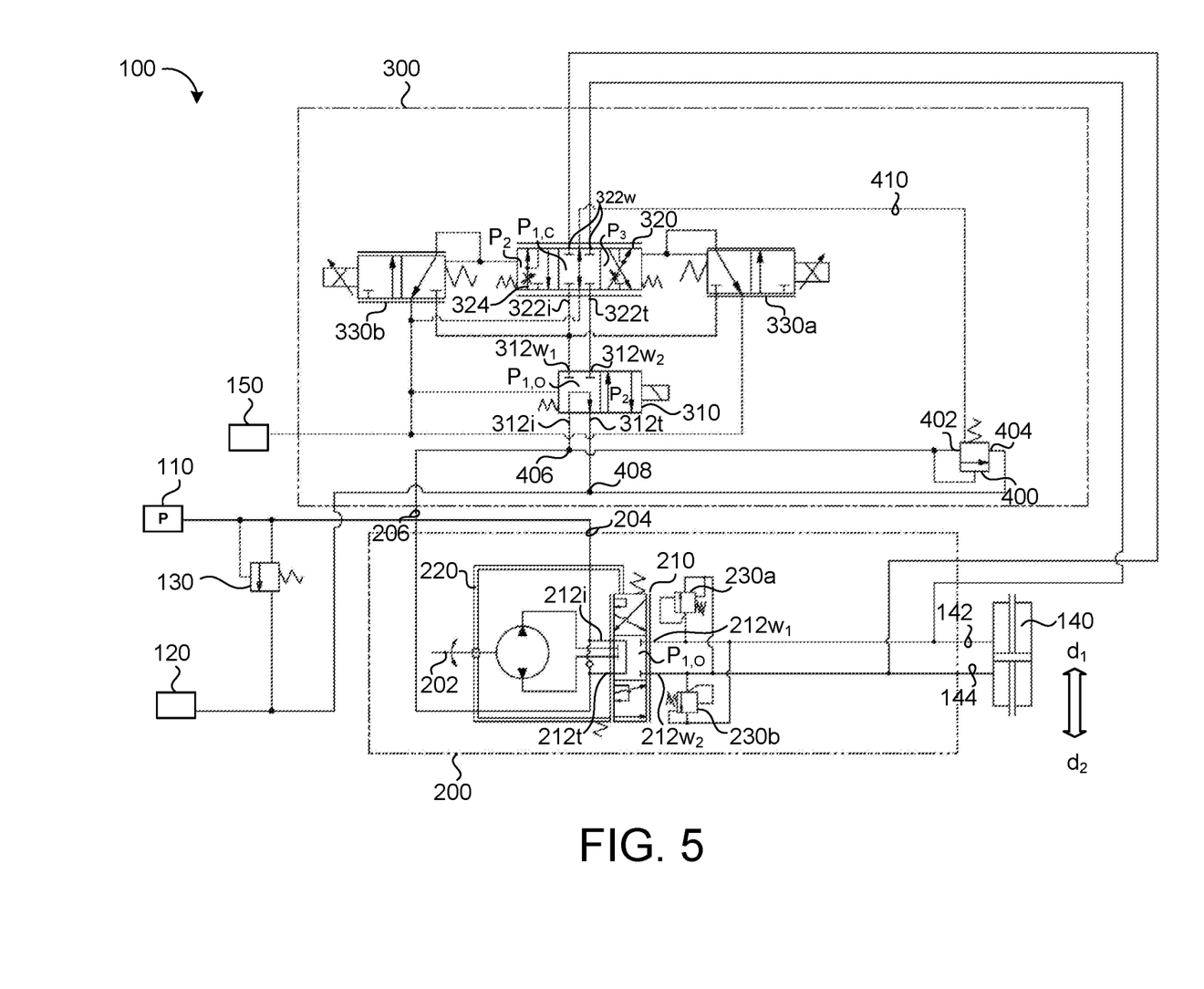

In some configurations, the hydraulic system 100 as depicted in FIGS. 2, 3, and 5, includes a modulating valve 400. A modulating valve 400 may be similar to a priority valve in some respects, but different in other respects. A priority valve generally divides flow between at least two separately operable circuits. For instance, in the case of two circuits, the circuits may be operating simultaneously or one at a time. When one of the circuits is a priority circuit, the hydraulic system 100 is designed to allow the priority circuit to utilize as much flow as the priority circuit needs (up to a capacity of a corresponding pump) at a tradeoff to other circuits utilizing the pump. In other words, a priority circuit receives flow for its requirements at a sacrifice of flow for operations of other circuits. Specifically, a non-priority circuit utilizing a priority valve is limited by the requirements of the priority circuit and cannot redirect flow, although potentially needed, from the priority circuit.

Unlike the modulating valve 400 that meters in one direction, the priority valve may meter in both directions. For example, the modulating valve 400 is not designed to divide or split evenly between the circuits. Rather, the modulating valve 400 sets-off the flow for one side (i.e. circuit) and gives the other circuit the remainder of flow. In some examples, when both circuits 200, 300 are steering circuits, the modulating valve 400 is configured to provide hydraulic fluid to closed-center circuit 300 when the closed-center circuit 300 is active and provides hydraulic fluid to the HMU circuit 200 when the HMU circuit 200 is active and the closed-center circuit 300 is deactivated (e.g., by the enable valve 310). In some examples, the modulating valve 400 includes a hydraulic signal line 410 (e.g., connected to a working port 322w of the steering valve 320) that helps prevent fluid flow loss or gain at the steering valve 320 when the steering cylinder pressure requirement changes. In one example, the cylinder hydraulic pressure requirement increases in the hydraulic signal line 410, the modulating valve 400 increases its restriction of the hydraulic fluid flow to the HMU circuit 200 to maintain fluid flow rate at the steering valve 320. In the opposite condition, if the cylinder pressure requirement reduces and the pressure in the signal line 410 reduces, the modulating valve 400 reduces its restriction of hydraulic fluid to the circuit 200; thereby maintaining a required flow rate to the steering valve 320.

In some implementations, the steering valve 320 as a proportional spool valve that includes a variable orifice 324. The variable orifice 324 is defined by an orifice area that may increase or decrease based on a position of the proportional spool valve. As the steering valve 320 moves toward an end of a position P, the orifice area increases. With the increase in orifice area, the hydraulic pressure across steering valve 320 to signal line 410 will reduce, increasing the pressure at the modulating valve 400 (e.g., in combination with the tension spring). Due to the increased pressure from the hydraulic signal line 410, the modulating valve 400 decreases the metered hydraulic flow at the output 404 of the modulating valve 400, increasing the flow to steering valve 320 until the new, desired, higher flow rate is established. In some examples, the decrease in the metered hydraulic flow at the output 404 of the modulating valve 400 decreases the hydraulic fluid provided to the HMU circuit 200. In an opposite manner, as the steering valve 320 moves toward the center position $P_C$, the orifice area decreases. With the decrease in orifice area, the hydraulic pressure across steering valve 320 to signal line 410 will increase, decreasing the pressure at the modulating valve 400 (e.g., in combination with the tension spring). Due to the decreased pressure from the hydraulic signal line 410, the modulating valve 400 increases the metered hydraulic flow at the output 404 of the modulating valve 400. In some examples, the increase in the metered hydraulic flow at the output 404 of the modulating valve 400 increases the hydraulic fluid provided to the HMU circuit 200.

Referring back to FIG. 2 in detail, the fixed displacement pump 110 is fluidly connected (e.g., directly connected) to an input port 402 of the modulating valve 400 and a supply input port 312i of the enable valve 310. The enable valve 310 may be a two position valve with a closed first position $P_{1,C}$. When the enable valve 310 is in the closed first position $P_{1,C}$, the hydraulic pressure builds at the modulating valve 400. Once the modulating valve 400 builds to a particular pressure to overcome the spring tension, the modulating valve 400 communicates the hydraulic fluid from the input port 402 to an inlet port 204 of the HMU via the output port 404. When the steering valve 210 is in the open center position $P_{1,O}$ (e.g., the HMU is inactive) and the HMU receives hydraulic fluid from the fixed displacement pump 110 (through the modulating valve 400), the hydraulic fluid passes through the open center position $P_{1,O}$ from the input port 212i of the steering valve 210 to the tank 120 via the tank port 212t of the steering valve 210. The steering valve 210 of the HMU may be a six port valve with ports connected to the bi-directional pump 220.

Although the hydraulic system 100 of FIG. 2 may be desirable in some situations (e.g., in particular physical system constraints) it may not be desirable in other situations. For example, failure of the closed-center circuit 300 and/or the modulating valve 400 might prevent or hamper manual steering at the HMU circuit 200. Such failures could include stiction of steer valve 320 (e.g., of the closed-center circuit such as a GPS guided steering system) in one of its outer positions. This would allow potential steering cylinder pressure to act on the modulating valve 400 at the signal line 410. This pressure would cause the modulating valve 400 to restrict hydraulic fluid flow from the input port 402 to the output port 404, increasing the pressure at the input port 402. This increase in pressure at the input port 402 and reduced pressure at the output port 404 would force the operator to manually develop enough input energy to supply required cylinder pressure to steer the vehicle 10 effectively, hampering or preventing steering. Additionally or alternatively, other failures include stiction of the modulating valve 400 in the position depicted in FIG. 2 or a midpoint modulating position, the fixed displacement pump 110 would be unable to supply the HMU circuit 200 effectively or at all (bypassing all or part of its supplied fluid across the relief valve 130 to tank 120 at a high pressure. This increase in pressure at the input port 402 would reduce the available pressure at the output port 404 forcing the operator to manually develop enough input energy to supply required cylinder pressure to steer the vehicle 10 effectively, hampering or preventing steering, potentially leaving the vehicle 10 stranded at a location of operation or ineffective at performing required work functions.

To combat these potential failure modes, for example, the hydraulic systems 100 of FIGS. 3-5 may alter component configurations, such as the location of the modulating valve 400, the location of the HMU circuit 200, and/or positions of the enable valve 310. Referring to FIG. 3, the first position $P_1$ of the enable valve 310 is an open position with a fluid connection between the supply input port 312i of the enable valve 310 and the tank port 312t of the enable valve 310. In this configuration, the fixed displacement pump 110 is fluidly connected to the supply input port 312i and the tank port 312t to provide hydraulic fluid to the inlet port 204 of the HMU circuit 200 when the enable valve 310 is in the open first position $P_{1,O}$. The input port 402 of the modulating valve 400 is in parallel fluid communication with a first fluid connection 406 between the fixed displacement pump 110 and the supply input port 312i of the enable valve 310. The output port 404 of the modulating valve 400 is in parallel fluid communication with a second fluid connection 408 between the tank port 312t of the enable valve 310 and the inlet port 204 of the HMU circuit 200. By this parallel configuration between the enable valve 310 and the HMU circuit 200, if the modulating valve 400 or the closed-center circuit 300 should fail, the open first position $P_{1,O}$ of the enable valve 310 still permits hydraulic fluid to flow to the HMU circuit 200 from the fixed displacement pump 110 to operate the HMU. In other words, when a failure occurs, the enable valve 310 may deactivate (e.g., a failure to the modulating valve 400 or the closed-center circuit 300) and, in its deactivated state, allow hydraulic fluid flow to the HMU circuit 200 for operation of the HMU circuit 200. In addition, if the enable valve 310 should fail, in its actuated position (e.g., the second position $P_2$), the modulating valve 400 would bypass the fixed displacement pump fluid flow to the HMU circuit 200 at a relatively low pressure from its input port 402 to its output port 404 allowing for HMU operation.

FIG. 4 is an example of a hydraulic system 100 similar to FIG. 3 except that a combination of a three-position enable valve 310 and a low pressure relief valve 500 functions similar to the modulating valve 400 of FIG. 3. This configuration of the hydraulic system 100 may conserve physical space and/or may take advantage of space available for the enable valve 310 of the closed-center circuit 300. The difference between the enable valve 310 of FIG. 3 and FIG. 4 is that the enable valve 310 of FIG. 4 includes an additional valve position, a third position $P_3$. In the system of FIG. 4, the second position $P_2$ and the third position $P_3$ define a proportion spool of the enable valve 310. In some examples, the proportional spool meters hydraulic fluid to the inlet port 204 of the HMU circuit 200 as the enable valve 310 transitions between the second positon $P_2$ and the third position $P_3$. In some implementations, the enable valve 310 includes a variable orifice 314 that prioritizes the metered hydraulic fluid to the closed-center circuit 300. For example, the HMU circuit 200 receives less hydraulic fluid from the fixed displacement pump 110 connected to the enable valve 310 as the closed-center circuit 300 demands more hydraulic fluid.

The relief valve 500 is not only a low pressure safety feature to relieve hydraulic pressure (e.g., similar to valves 130, 230), but also functions to relieve fluid pressure caused by the transitioning of the proportional spool of the enable valve 310 between positions P. For example, as the enable valve 310 transitions from the first position $P_1$ to the second position $P_2$, the enable valve 310 transitions from an off-position to an on-position for the hydraulic fluid flow. During this transition, the enable valve 310 inevitably passes through a position P where the enable valve 310 blocks hydraulic flow. To prevent failures due to an increase in fluid pressure from the blocked hydraulic flow, the relief valve 500 opens and relieves pressure to the inlet port 204 of the HMU circuit 200. Referring to FIG. 4, the input port 502 of the relief valve 500 is in parallel fluid communication with a first fluid connection 506 between a supply input port 312$i$ of the enable valve 310 and the fixed displacement pump 110. The output port 504 of the relief valve 500 is in parallel fluid communication with a tank port 312$t$ of the enable valve 310 and the inlet port 204 of the HMU circuit 200.

Additionally, the relief valve 500 may be set to operate at a higher pressure than the modulating valve 400. By operating at a higher pressure than the modulating valve 400, the relief valve 500 is generally closed during operation of the closed-center circuit 300 unless pressure at the relief valve 500 overcomes the spring tension and opens the output port 504 of the relief valve 500 to provide hydraulic fluid from the input port 502 to the inlet port 204 of the HMU circuit 200. As such, the relief valve 500 functions as a safety feature much like valves 130, 230.

With reference to FIG. 5, the hydraulic system 100 includes the HMU circuit 200 upstream of the closed-center circuit 300 (i.e., the HMU circuit 200 is in fluid communication with the fixed displacement pump prior to the closed-center circuit 300). Whether this configuration is feasible for the hydraulic system 100 may depend on acceptable pressures for the HMU circuit 200 and/or the closed-center circuit 300. Specifically, some HMU circuits 200 may not be able to directly connect to the fixed displacement pump 110 when the HMU circuit 200 is not compatible with a pressure of the hydraulic fluid directly from the HMU circuit 200 to the closed-center circuit 300 when the closed-center circuit 300 is in use. In other configurations, the closed-center circuit 300 may need to operate upstream of the HMU circuit 200 and connect directly to the fixed displacement pump 110 to operate with high pressure (e.g., before components of the hydraulic system 100 diminish the operating pressure).

FIG. 5 illustrates as example in which the fixed displacement pump 110 is in fluid communication with the inlet port 204 of the HMU circuit 200. In one example, when the steering valve 210 is in the open center position $P_{1,O}$, the outlet port 206 provides the hydraulic fluid from the fixed displacement pump 110 to the supply input port 312$i$ of the enable valve 310. In the open first position $P_{1,O}$ of the enable valve 310, the supply input port 312$i$ is fluidly connected to the tank port 312$t$. In this configuration, the tank port 312$t$ of the enable valve 310 is fluidly connected to the tank 120. Furthermore, the input port 402 of the modulating valve 400 is in parallel fluid communication with a first fluid connection 406 between the outlet port 206 of the HMU circuit 200 and the supply input port 312$i$ of the enable valve 310, and the output port 404 of the modulating valve 400 is in parallel fluid communication with a second fluid connection 408 between the tank 120 and the tank port 312$t$ of the enable valve 310. Other than these modifications, the components of hydraulic system 100 of FIG. 5 may operate similar to the components of FIG. 3.

Figure 6:
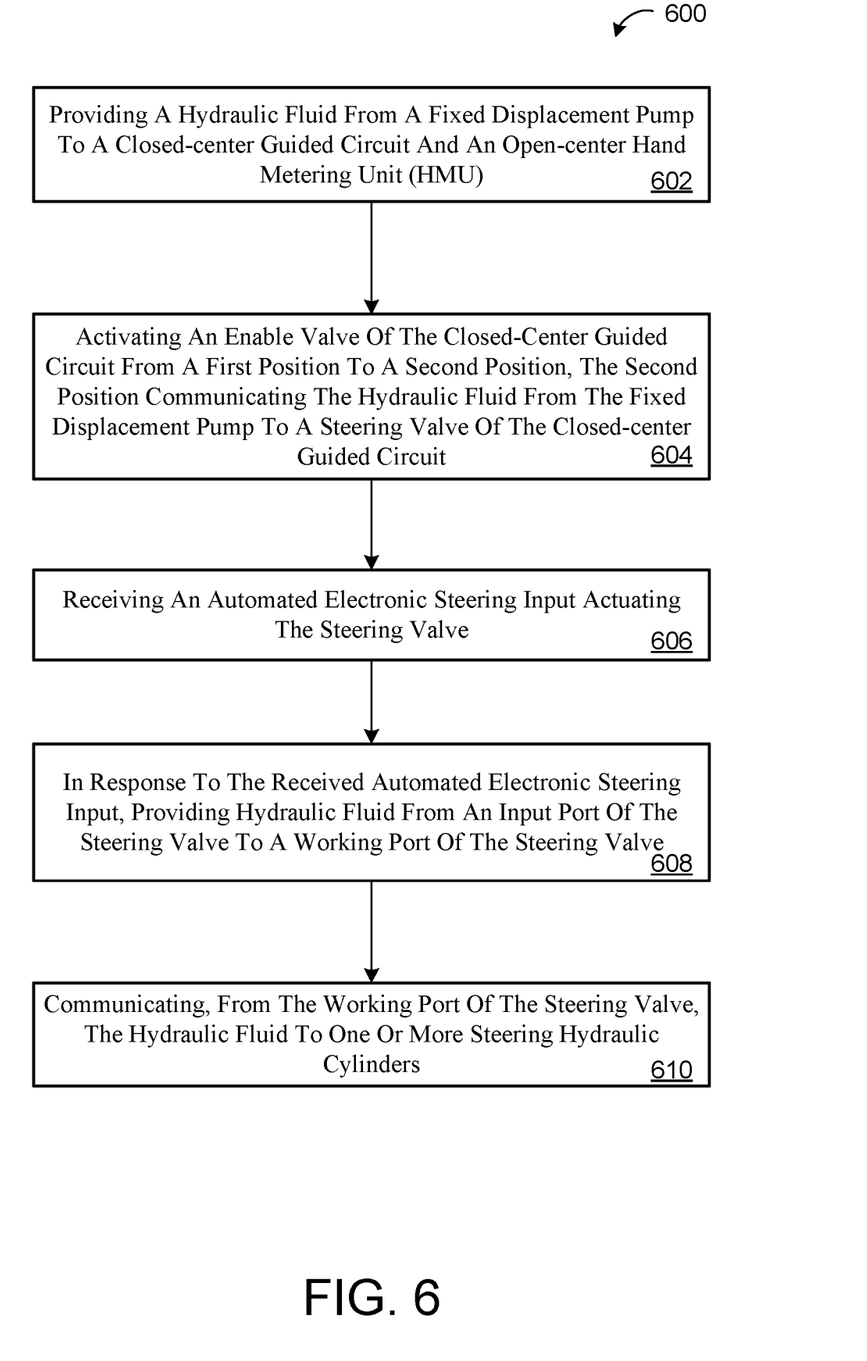
FIG. 6 is a flow diagram of an example arrangement for implementing a hydraulic system.

FIG. 6 is an example of a method 600 of implementing the hydraulic system 100. At operation 602, the method 600 provides a hydraulic fluid from a fixed displacement pump 110 to a closed-center circuit 300 and an open-center hand metering unit (HMU) 200. At operation 604, the method 600 activates an enable valve 310 of the closed-center circuit 300 from a first position $P_1$ to a second position $P_2$. The second position $P_2$ communicates the hydraulic fluid from the fixed displacement pump 110 to a steering valve 320 of the closed-center circuit 300. At operation 606, the method 600 receives an automated electronic steering input actuating the steering valve 320. At operation 608, the method 600, in response to the received automated electronic steering input, provides hydraulic fluid from an input port 322$i$ of the steering valve 320 to a working port 322$w$ of the steering valve 320. At operation 610, the method 600 communicates, the hydraulic fluid from the working port 322$w$ of the steering valve 320 to one or more steering hydraulic cylinders 140.

In some implementations, the method 600 deactivates the closed-center circuit 300 by switching the enable valve 310 to the first position $P_1$ corresponding to a closed position $P_C$ of the enable valve 310. In the first position $P_1$, the method 600 meters hydraulic fluid from an input port 402 of a modulating valve 400 connected to the fixed displacement pump 110 to an inlet port 204 of the HMU 200 through an output port 404 of the modulating valve 400. The deactivation of the closed-center circuit 300 may occur in response to a failure at the closed-center circuit 300.

In some configurations, the method 600 deactivates the closed-center circuit 300 by switching the enable valve 310 to the first position $P_1$ where the first position $P_1$ corresponds to an open position $P_O$ of the enable valve 310 with a first-position fluid connection 406 between a supply input port 312$i$ of the enable valve 310 and a tank port 312$t$ of the enable valve 310. In the first position $P_1$, the method 600 provides hydraulic fluid from the fixed displacement pump 110 to an inlet port 204 of the HMU 200. In one such example, the method 600 additionally transitions the enable valve 310 of the closed-center circuit 300 from the second position $P_2$ to a third position $P_3$ where the second position $P_2$ and the third position $P_3$ of the enable valve 310 defining a proportional spool valve and provides hydraulic fluid from a relief valve 500 to the HMU 200. Here, the relief valve 500 includes an input port 502 and an output port 504 where the input port 502 of the relief valve 500 is in parallel fluid communication with a first-fluid connection 506 between the fixed displacement pump 110 and the supply input port 312$i$ of the enable valve 310 and the output port 504 of the relief valve 500 is in parallel fluid communication with a second fluid connection 508 between the tank port 312$t$ of the enable valve 310 and the inlet port 204 of the HMU 200.

In some examples, the method 600 also provides hydraulic fluid from a hydraulic signal line 410 of a modulating valve 400 to the working port 322$w$ of the steering valve 320 where the modulating valve 400 is in fluid communication with the fixed displacement pump 110 and the HMU 200. In one example, the method 600 additionally meters hydraulic fluid from an input port 402 of the modulating valve 400 to an inlet port 204 of the HMU 200 through an output port 404 of the modulating valve 400, wherein the input port 402 of the modulating valve 400 is in parallel fluid communication with a first fluid connection 406 between the fixed displacement pump 110 and a supply input port 312*i* of the enable valve 310, and wherein the output port 404 of the modulating valve 400 is in parallel fluid communication with a second fluid connection 408 between a tank port 312*t* of the enable valve 310 and the inlet port 204 of the HMU 200. In another example, the method 600 additionally meters hydraulic fluid+404 of the modulating valve 400, wherein the input port 402 of the modulating valve 400 is in parallel fluid communication with a first fluid connection 406 between the fixed displacement pump 110 through an outlet 206 of the HMU 200 and a supply input port 312*i* of the enable valve 310, and wherein the output port 404 of the modulating valve 400 is in parallel fluid communication with a second fluid connection 408 between the tank port 312*t* of the enable valve 310 and the tank 120.

Optionally, the method 600 provides hydraulic fluid from a hydraulic signal line 410 of a modulating valve 400 to the working port 322*w* of the steering valve 320 where the modulating valve 400 is in fluid communication with the fixed displacement pump 110 and the HMU 200. The method 600 may also meter hydraulic fluid to the HMU 200 through the modulating valve 400 based on a position P of the steering valve 320 of the closed-center circuit 300. Here, the method 600 may meter hydraulic fluid by increasing an orifice area of a variable orifice 324 of the steering valve 320 and decreasing hydraulic flow to the HMU 200.

A number of implementations have been described. Nevertheless, it will be understood that various modifications may be made without departing from the spirit and scope of the disclosure. Accordingly, other implementations are within the scope of the following claims.

What is claimed is:

1. A system comprising:
    a fixed displacement pump;
    a closed-center circuit in fluid communication with the fixed displacement pump;
    a tank;
    an open-center hand metering unit (HMU) in fluid communication with the fixed displacement pump at an inlet port of the HMU, the fixed displacement pump delivering a constant flow to the inlet port of the HMU for a given drive speed of the fixed displacement pump; and
    wherein, when the HMU is inactive, the tank is fluidly connected to the inlet port of the HMU via a flow path through the HMU that includes an outlet port of the HMU.

2. The system of claim 1, wherein the closed-center circuit includes a steering valve and an enable valve, the enable valve in fluid communication with the steering valve and including a first position and a second position, the second position configured to provide fluid communication between the fixed displacement pump and the steering valve.

3. The system of claim 2, further comprising a modulating valve including
    an input port in fluid communication with the fixed displacement pump, and
    an output port in fluid communication with the inlet port of the HMU.

4. The system of claim 3, wherein:
    the first position of the enable valve is a closed position;
    the input port of the modulating valve is fluidly connected to the fixed displacement pump; and
    the output port of the modulating valve is fluidly connected to the inlet port of the HMU.

5. The system of claim 3, wherein:
    the first position of the enable valve is an open position including a first-position fluid connection between a supply input port and a tank port, the tank port in fluid communication with the inlet port of the HMU;
    the input port of the modulating valve is in parallel fluid communication with a first fluid connection between the fixed displacement pump and the supply input port of the enable valve; and
    the output port of the modulating valve is in parallel fluid communication with a second fluid connection between the tank port of the enable valve and the inlet port of the HMU.

6. The system of claim 3, wherein:
    the first position of the enable valve is an open position, the open position including a first-position fluid connection between a supply input port and a tank port, the supply input port in fluid communication with the outlet port of the HMU, the outlet port of the HMU in fluid communication with the fixed displacement pump at a center position of the HMU;
    the input port of the modulating valve is in parallel fluid communication with a first fluid connection between the outlet port of the HMU and the supply input port of the enable valve; and
    the output port of the modulating valve is in parallel fluid communication with a second fluid connection between the tank and the tank port of the enable valve.

7. The system of claim 3, wherein the modulating valve includes a hydraulic signal line in fluid communication with a working port of the closed-center circuit.

8. The system of claim 2, further comprising a relief valve including an input port and an output port, the input port of the relief valve in parallel fluid communication with a first fluid connection between a supply input port of the enable valve and the fixed displacement pump, and the output port of the relief valve in parallel fluid communication with a tank port of the enable valve and the inlet port of the HMU.

9. The system of claim 8, wherein the enable valve includes a third position, the second position of the enable valve and the third position of the enable valve defining a spool valve configured to prioritize fluid flow to the closed-center circuit.

10. The system of claim 1, wherein each of the closed-center circuit and the HMU include a steering valve fluidly communicating with the fixed displacement pump.

11. The system of claim 10, wherein each of the steering valve of the closed-center circuit and of the steering valve of the HMU includes a proportional spool valve, the proportional spool valve of the closed-center circuit providing automated steering by actuating and transferring hydraulic fluid from the fixed displacement pump to one or more hydraulic cylinders based on an electrical input.

12. The system of claim 11, further comprising:
    a modulating valve including an input port, an output port, and a hydraulic signal line, the input port in fluid communication with the fixed displacement pump, the output port in fluid communication with the inlet port of the HMU, and the hydraulic signal line in fluid communication with a working port of the closed-center circuit,
    wherein the proportional spool valve of the closed-center circuit includes a variable orifice, the variable orifice defined by an orifice area proportional to a position of the proportional spool valve, and
    wherein when the orifice area increases, a modulating valve decreases fluid communication to the HMU.

13. A vehicle including one or more hydraulic steering cylinders, the vehicle comprising:
a fixed displacement pump;
a closed-center steering circuit in fluid communication with the fixed displacement pump;
a tank;
an open-center hand metering unit (HMU) in fluid communication with the fixed displacement pump at an inlet port of the HMU, the fixed displacement pump delivering a constant flow to the inlet port of the HMU for a given drive speed of the fixed displacement pump;
wherein, when the HMU is inactive the tank is fluidly connected to the inlet port of the HMU via a flow path through the HMU that includes an outlet port of the HMU; and
wherein the closed-center steering circuit and the HMU hydraulically communicate with the one or more hydraulic steering cylinders.

14. The vehicle of claim 13, wherein the closed-center steering circuit includes a steering valve and an enable valve, the enable valve fluidly connected to the steering valve and including a first position and a second position, the second position configured to provide fluid communication between the fixed displacement pump and the steering valve.

15. The vehicle of claim 14, further comprising a modulating valve including
an input port in fluid communication with the fixed displacement pump, and
an output port fluidly connected to the inlet port of the HMU.

16. The vehicle of claim 15, wherein:
the first position of the enable valve is a closed position;
the input port of the modulating valve is fluidly connected to the fixed displacement pump; and
the output port of the modulating valve is fluidly connected to the inlet port of the HMU.

17. The vehicle of claim 15, wherein:
the first position of the enable valve is an open position including a first-position fluid connection between a supply input port and a tank port, the tank port in fluid communication with the inlet port of the HMU;
the input port of the modulating valve is in parallel fluid communication with a first fluid connection between the fixed displacement pump and the supply input port of the enable valve; and
the output port of the modulating valve is in parallel fluid communication with a second fluid connection between the tank port of the enable valve and the inlet port of the HMU.

18. The vehicle of claim 15, wherein:
the first position of the enable valve is an open position, the open position including a first-position fluid connection between a supply input port and a tank port, the supply input port in fluid communication with the outlet port of the HMU, the outlet port of the HMU in fluid communication with the fixed displacement pump at a center position of the HMU;
the input port of the modulating valve is in parallel fluid communication with a first fluid connection between the outlet port of the HMU and the supply input port of the enable valve; and
the output port of the modulating valve is in parallel fluid communication with a second fluid connection between the outlet port of the HMU and the tank port of the enable valve.

19. The vehicle of claim 15, wherein the modulating valve includes a hydraulic signal line in fluid communication with a working port of the closed-center steering circuit.

20. The vehicle of claim 14, further comprising a relief valve including an input port and an output port, the input port of the relief valve in parallel fluid communication with a first fluid connection between a supply input port of the enable valve and the fixed displacement pump, and the output port of the relief valve in parallel fluid communication with a tank port of the enable valve and the inlet port of the HMU.

21. The vehicle of claim 20, wherein the enable valve includes a third position, the second position of the enable valve and the third position of the enable valve defining a spool valve configured to prioritize fluid flow to the closed-center steering circuit.

22. The vehicle of claim 13, wherein each of the closed-center steering circuit and the HMU includes a steering valve fluidly communicating with the fixed displacement pump.

23. The vehicle of claim 22, wherein each of the steering valve of the closed-center circuit and the steering valve of the HMU includes a proportional spool valve, the proportional spool valve of the closed-center circuit providing automated steering by actuating and transferring hydraulic fluid from the fixed displacement pump to one or more hydraulic cylinders based on an electrical input.

24. The vehicle of claim 23, further comprising:
a modulating valve including an input port, an output port, and a hydraulic signal line, the input port in fluid communication with the fixed displacement pump, the output port in fluid communication with the inlet port of the HMU, and the hydraulic signal line in fluid communication with a working port of the proportional spool valve of the closed-center steering circuit,
wherein the proportional spool valve of the closed-center steering circuit includes a variable orifice, the variable orifice defined by an orifice area proportional to a position of the proportional spool valve, and
wherein when the orifice area increases, a modulating valve decreases fluid communication to the HMU.

25. A system comprising:
a fixed displacement pump;
a closed-center circuit in fluid communication with the fixed displacement pump, wherein the closed-center circuit includes a steering valve and an enable valve, the enable valve in fluid communication with the steering valve and including a first position and a second position, the second position configured to provide fluid communication between the fixed displacement pump and the steering valve;
a tank;
an open-center hand metering unit (HMU) in fluid communication with the fixed displacement pump at an inlet port of the HMU, the fixed displacement pump delivering a constant flow to the inlet port of the HMU for a given drive speed of the fixed displacement pump;
wherein the tank is fluidly connected to the inlet port of the HMU via an outlet port of the HMU when the HMU is inactive; and
a modulating valve including (i) an input port in fluid communication with the fixed displacement pump and (ii) an output port in fluid communication with the inlet port of the HMU.

26. The system of claim 25, wherein:
the first position of the enable valve is a closed position;
the input port of the modulating valve is fluidly connected to the fixed displacement pump; and
the output port of the modulating valve is fluidly connected to the inlet port of the HMU.

27. The system of claim 25, wherein:
the first position of the enable valve is an open position including a first-position fluid connection between a supply input port and a tank port, the tank port in fluid communication with the inlet port of the HMU;
the input port of the modulating valve is in parallel fluid communication with a first fluid connection between the fixed displacement pump and the supply input port of the enable valve; and
the output port of the modulating valve is in parallel fluid communication with a second fluid connection between the tank port of the enable valve and the inlet port of the HMU.

28. The system of claim 25, wherein:
the first position of the enable valve is an open position, the open position including a first-position fluid connection between a supply input port and a tank port, the supply input port in fluid communication with the outlet port of the HMU, the outlet port of the HMU in fluid communication with the fixed displacement pump at a center position of the HMU;
the input port of the modulating valve is in parallel fluid communication with a first fluid connection between the outlet port of the HMU and the supply input port of the enable valve; and
the output port of the modulating valve is in parallel fluid communication with a second fluid connection between the tank and the tank port of the enable valve.

29. The system of claim 25, wherein the modulating valve includes a hydraulic signal line in fluid communication with a working port of the closed-center circuit.

\* \* \* \* \*